Jan. 24, 1933.   S. E. MONTGOMERY   1,895,202
DAMPER CONTROL
Filed June 26, 1930

S. E. Montgomery
Inventor

By C.A.Snow & Co.
Attorneys.

Patented Jan. 24, 1933

1,895,202

UNITED STATES PATENT OFFICE

SAMUEL E. MONTGOMERY, OF TATE, GEORGIA

DAMPER CONTROL

Application filed June 26, 1930. Serial No. 464,014.

This invention relates to dampers used in connection with various types of stoves, the primary object of the invention being to provide means for automatically controlling the damper.

An important object of the invention is to provide a damper control for use in connection with brooder stoves which include pipes leading from the stoves and through which the products of combustion pass, there being provided swinging dampers mounted within the pipes for controlling the draft of air through the pipes to regulate the temperature of the brooder.

A further object of the invention is to provide a damper so constructed that it may be connected with the usual thermostat of a brooder, for operating the damper to open or close the damper to maintain an even temperature within the brooder, at all times.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
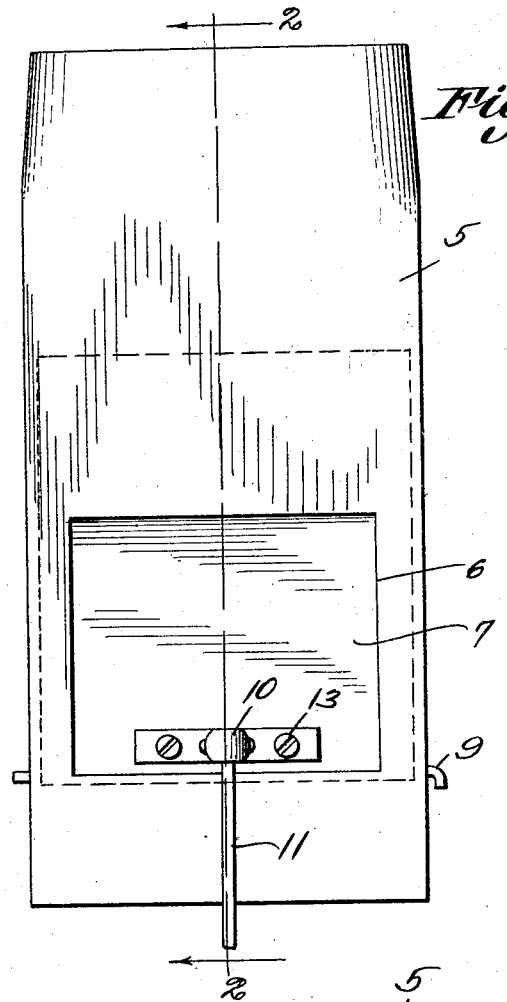
Figure 1 is an elevational view of a pipe section equipped with a damper constructed in accordance with the invention.

Referring to the drawing in detail, the reference character 5 designates a pipe section forming a part of the chimney of a brooder stove, the upper end of the pipe section being tapered to fit within the pipe with which the device is used.

The pipe section 5 is formed with a cut out portion 6 defining an opening to permit air to pass into the pipe.

Pivotally mounted within the pipe section, is a damper 7 that is provided with inwardly extended flanges 8, which flanges are disposed adjacent to the side walls of the pipe section 5, preventing the air from entering the pipe section around the side edges of the damper. The flanges are formed with aligning openings to receive the pivot pin 9, on which the damper 7 is mounted. Secured to the damper 7 is a connecting arm 10 embodying spaced leg members between which the upper end of the rod 11 is mounted, the ends of the leg members being extended laterally as at 12, where they are provided with openings to receive the bolts 13 by means of which the arm 10 is connected to the damper.

A plurality of openings 14 are provided in the leg members of the connecting arm, which openings accommodate the bolt 15 that connects the rod 11 to the connecting arm 10.

Figure 2:
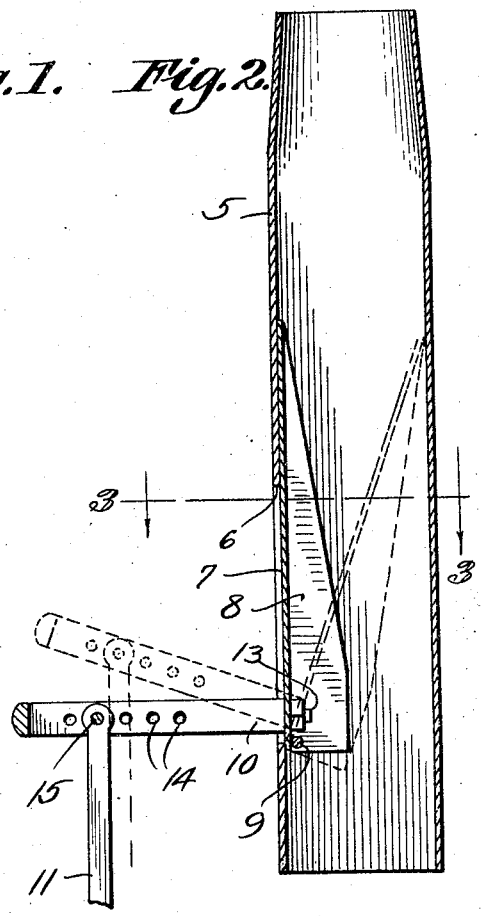
Figure 2 is a sectional view taken on line 2—2 of Figure 1.
Figure 3:
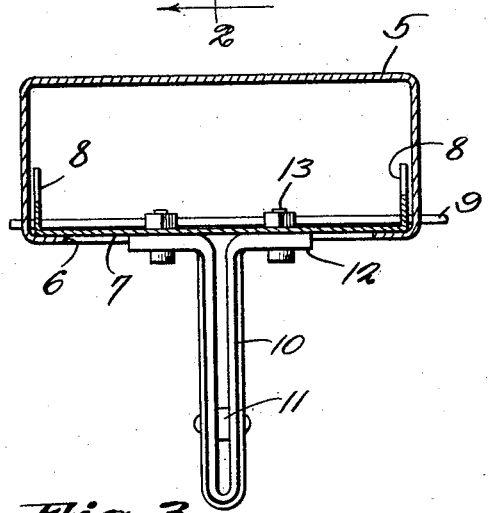
Figure 3 is a sectional view taken on line 3—3 of Figure 2.

This rod 11 extends downwardly and connects with the usual thermostat employed in brooder stove construction, so that when the thermostat moves under excessive heat, the arm 10 will be moved upwardly to a position as shown in dotted lines in Figure 2 of the drawing, whereupon the damper 7 is moved inwardly to permit air to enter the pipe section and chimney to cause the stove to cool. It is obvious that when the stove cools, the thermostat will operate to move the damper to its closed position to cause a draft through the stove.

I claim:

The combination with a chimney of rectangular cross-section having an opening in the front wall thereof, of a damper for controlling the passage of air through the opening, said damper comprising a body portion of a length to extend an appreciable distance beyond the opening to direct air entering the opening, upwardly, said body portion being of a width greater than the width of the opening to overlap the side edges of the opening, flanges extending inwardly from the side edges of the body portion and disposed adjacent to the side walls of the chimney preventing the passage of air around the side edges of the body portion, said flanges having openings formed therein, said chimney having openings, a pivot pin extending through the openings of the damper and chimney pivotally supporting the damper, and an operating arm extending from the damper.

In testimony that I claim the foregoing as my own, I have hereto affixed my signature.

SAMUEL E. MONTGOMERY.